US012574363B2

(12) United States Patent
Bhandari et al.

(10) Patent No.: US 12,574,363 B2
(45) Date of Patent: Mar. 10, 2026

(54) SYSTEM FOR USER-INITIATED AUTHENTICATION OF AN ELECTRONIC COMMUNICATION CHANNEL USING A SECURE COMPUTING APPLICATION TOKEN

(71) Applicant: BANK OF AMERICA CORPORATION, Charlotte, NC (US)

(72) Inventors: Amit Bhandari, Uttarakhand (IN); Nipun Mahajan, Lawrenceville, NJ (US); Vijay Kumar Yarabolu, Telangana (IN); Amit Mishra, Egattur (IN); Yogesh Raghuvanshi, Princetown, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 355 days.

(21) Appl. No.: 18/080,292

(22) Filed: Dec. 13, 2022

(65) Prior Publication Data

US 2024/0195802 A1      Jun. 13, 2024

(51) Int. Cl.
| | |
|---|---|
| *G06F 7/04* | (2006.01) |
| *G06F 15/16* | (2006.01) |
| *H04L 9/40* | (2022.01) |
| *H04L 29/06* | (2006.01) |

(52) U.S. Cl.
CPC .................................. *H04L 63/083* (2013.01)

(58) Field of Classification Search
CPC ..................................................... H04L 63/083
USPC ............................................................ 726/9
See application file for complete search history.

(56) References Cited

U.S. PATENT DOCUMENTS

| | | |
|---|---|---|
| 8,543,665 B2 | 9/2013 | Ansari |
| 9,119,067 B2 | 8/2015 | Santamaria |
| 9,185,096 B2 | 11/2015 | Avni |
| 9,501,666 B2 | 11/2016 | Lockett |
| 9,679,332 B2 | 6/2017 | Kim |
| 9,762,576 B2 | 9/2017 | Dispensa |
| 10,091,195 B2 | 10/2018 | Lindemann |
| 10,091,197 B2 | 10/2018 | Rhoads |
| 10,152,211 B2 | 12/2018 | Koushik |
| 10,503,469 B2 | 12/2019 | Rutherford |
| 10,755,274 B2 | 8/2020 | Ortiz |
| 10,846,694 B2 | 11/2020 | Wong |

(Continued)

*Primary Examiner* — Jeffrey C Pwu
*Assistant Examiner* — Samuel Ambaye
(74) *Attorney, Agent, or Firm* — Moore & Van Allen PLLC; Nicholas C. Russell

(57) ABSTRACT

A system is provided for user-initiated authentication of an electronic communication channel using a secure computing application token. In particular, the system may comprise a token generation application installed on an endpoint device of a user, where the application may be configured to perform authentication of communication channels based on receiving user input. Upon receiving a request to establish a secure communication channel from a remote device, the endpoint device may receive a voice sample from the user. Based on the attributes of the voice sample and of the application session, the endpoint device may generate an alphanumeric character string that may serve as a secure token to be verified against a second character string received from the remote device. If a match is detected, the endpoint device may authenticate and generate the communication channel.

18 Claims, 4 Drawing Sheets

(56) References Cited

U.S. PATENT DOCUMENTS

| | | | |
|---|---|---|---|
| 11,038,868 B2 | 6/2021 | Miu | |
| 11,356,259 B1 * | 6/2022 | Agnew | H04L 9/3271 |
| 2013/0326590 A1 * | 12/2013 | Schroeder, Jr. | H04L 63/08 |
| | | | 726/4 |
| 2015/0350168 A1 * | 12/2015 | Hayton | G06F 21/32 |
| | | | 713/168 |
| 2016/0057139 A1 * | 2/2016 | McDonough | H04L 63/168 |
| | | | 726/6 |
| 2019/0097909 A1 | 3/2019 | Puri | |
| 2019/0253404 A1 | 8/2019 | Briceno | |
| 2020/0074541 A1 | 3/2020 | Finneran | |
| 2020/0151349 A1 | 5/2020 | Cavanaugh | |
| 2020/0252413 A1 | 8/2020 | Buzbee | |
| 2021/0185531 A1 | 6/2021 | Avetisov | |
| 2022/0394468 A1 * | 12/2022 | Avetisov | H04L 63/0884 |

* cited by examiner

SYSTEM FOR USER-INITIATED AUTHENTICATION OF AN ELECTRONIC COMMUNICATION CHANNEL USING A SECURE COMPUTING APPLICATION TOKEN

FIELD OF THE INVENTION

The present invention embraces a system for user-initiated authentication of an electronic communication channel using a secure computing application token.

BACKGROUND

There is a need for a secure way to perform user-based authentication of communication channels.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for user-initiated authentication of an electronic communication channel using a secure computing application token. In particular, the system may comprise a token generation application installed on an endpoint device of a user, where the application may be configured to perform authentication of communication channels based on receiving user input. Upon receiving a request to establish a secure communication channel from a remote device, the endpoint device may receive a voice sample from the user. Based on the attributes of the voice sample and of the application session, the endpoint device may generate an alphanumeric character string that may serve as a secure token to be verified against a second character string received from the remote device. If a match is detected, the endpoint device may authenticate and generate the communication channel. In this way, the system may provide a user-based method of authenticating communication channels with remote devices and entities.

Accordingly, embodiments of the present disclosure provide a system for user-initiated authentication of an electronic communication channel using a secure computing application token, the system comprising at least one non-transitory storage device; and at least one processor coupled to the at least one non-transitory storage device, wherein the at least one processor is configured to receive, from a remote device, a request to establish a communication channel with the remote device; capture, using a token generation application, a voice data sample from a first user; extract one or more voice data attributes from the voice data sample; generate a secure token by inputting the voice data attributes and application session data associated with the token generation application into a cryptographic algorithm; receive an authentication string from the remote device; and authenticate the remote device based on comparing the secure token with the authentication string.

In some embodiments, the voice data attributes comprise a fundamental frequency and an intensity of the voice data sample.

In some embodiments, wherein the communication channel is a voice communication channel, wherein the authentication string is received from the remote device through the communication channel, wherein authenticating the remote device comprises presenting the secure token on a display device.

In some embodiments, the authentication string is received from the remote device over a network connection, wherein authenticating the remote device further comprises detecting a match between the secure token and the authentication string; and based on detecting the match, presenting a notification on a display device, wherein the notification indicates that the remote device has been authenticated.

In some embodiments, the authentication string is received from the remote device over a network connection, wherein authenticating the remote device further comprises detecting no match between the secure token and the authentication string; and based on detecting no match, presenting a notification on a display device, wherein the notification indicates that the remote device could not be authenticated.

In some embodiments, authenticating the remote device further comprises automatically closing the communication channel with the remote device.

In some embodiments, the cryptographic algorithm comprises a hash function.

Embodiments of the present disclosure also provide a computer program product for user-initiated authentication of an electronic communication channel using a secure computing application token, the computer program product comprising a non-transitory computer-readable medium comprising code causing an apparatus to receive, from a remote device, a request to establish a communication channel with the remote device; capture, using a token generation application, a voice data sample from a first user; extract one or more voice data attributes from the voice data sample; generate a secure token by inputting the voice data attributes and application session data associated with the token generation application into a cryptographic algorithm; receive an authentication string from the remote device; and authenticate the remote device based on comparing the secure token with the authentication string.

In some embodiments, the voice data attributes comprise a fundamental frequency and an intensity of the voice data sample.

In some embodiments, the communication channel is a voice communication channel, wherein the authentication string is received from the remote device through the communication channel, wherein authenticating the remote device comprises presenting the secure token on a display device.

In some embodiments, the authentication string is received from the remote device over a network connection, wherein authenticating the remote device further comprises detecting a match between the secure token and the authentication string; and based on detecting the match, presenting a notification on a display device, wherein the notification indicates that the remote device has been authenticated.

In some embodiments, the authentication string is received from the remote device over a network connection, wherein authenticating the remote device further comprises detecting no match between the secure token and the authentication string; and based on detecting no match, presenting a notification on a display device, wherein the notification indicates that the remote device could not be authenticated.

In some embodiments, authenticating the remote device further comprises automatically closing the communication channel with the remote device.

Embodiments of the present disclosure also provide a computer-implemented method for user-initiated authentication of an electronic communication channel using a secure computing application token, the computer-implemented method comprising receiving, from a remote device, a request to establish a communication channel with the remote device; capturing, using a token generation application, a voice data sample from a first user; extracting one or more voice data attributes from the voice data sample; generating a secure token by inputting the voice data attributes and application session data associated with the token generation application into a cryptographic algorithm; receiving an authentication string from the remote device; and authenticating the remote device based on comparing the secure token with the authentication string.

In some embodiments, the voice data attributes comprise a fundamental frequency and an intensity of the voice data sample.

In some embodiments, the communication channel is a voice communication channel, wherein the authentication string is received from the remote device through the communication channel, wherein authenticating the remote device comprises presenting the secure token on a display device.

In some embodiments, the authentication string is received from the remote device over a network connection, wherein authenticating the remote device further comprises detecting a match between the secure token and the authentication string; and based on detecting the match, presenting a notification on a display device, wherein the notification indicates that the remote device has been authenticated.

In some embodiments, the authentication string is received from the remote device over a network connection, wherein authenticating the remote device further comprises detecting no match between the secure token and the authentication string; and based on detecting no match, presenting a notification on a display device, wherein the notification indicates that the remote device could not be authenticated.

In some embodiments, authenticating the remote device further comprises automatically closing the communication channel with the remote device.

In some embodiments, the cryptographic algorithm comprises a hash function.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
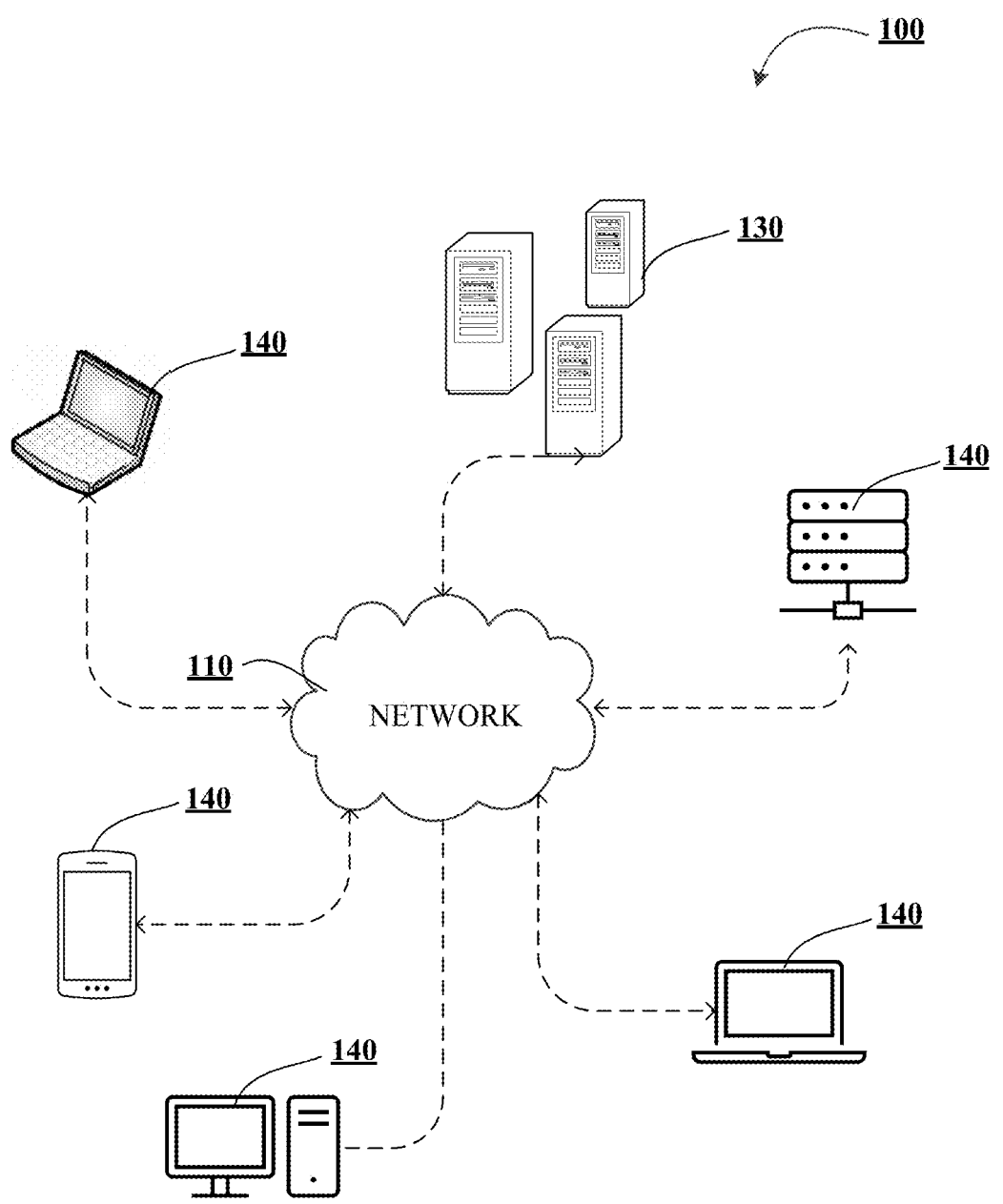
Figure 1B:
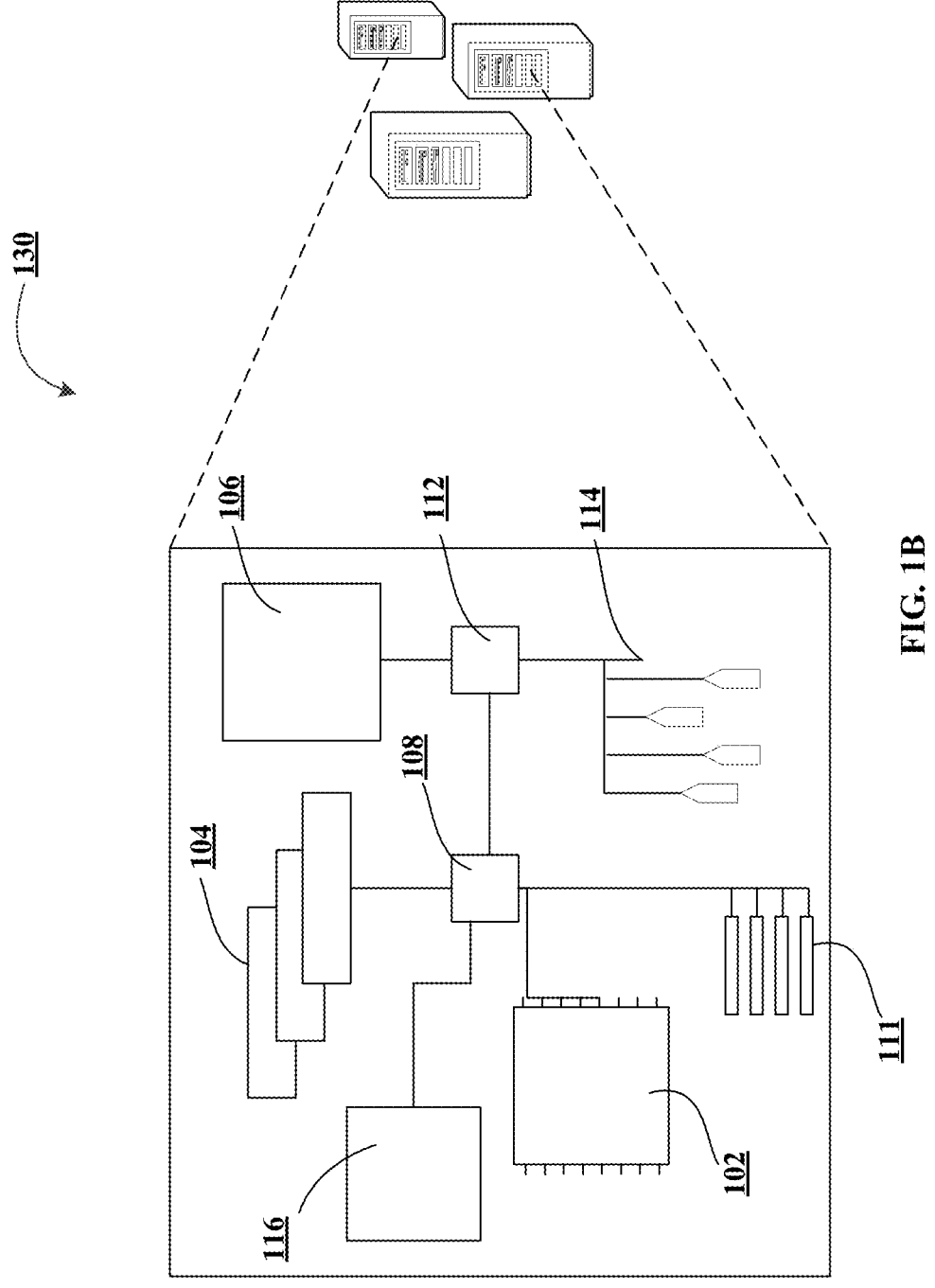
Figure 1C:
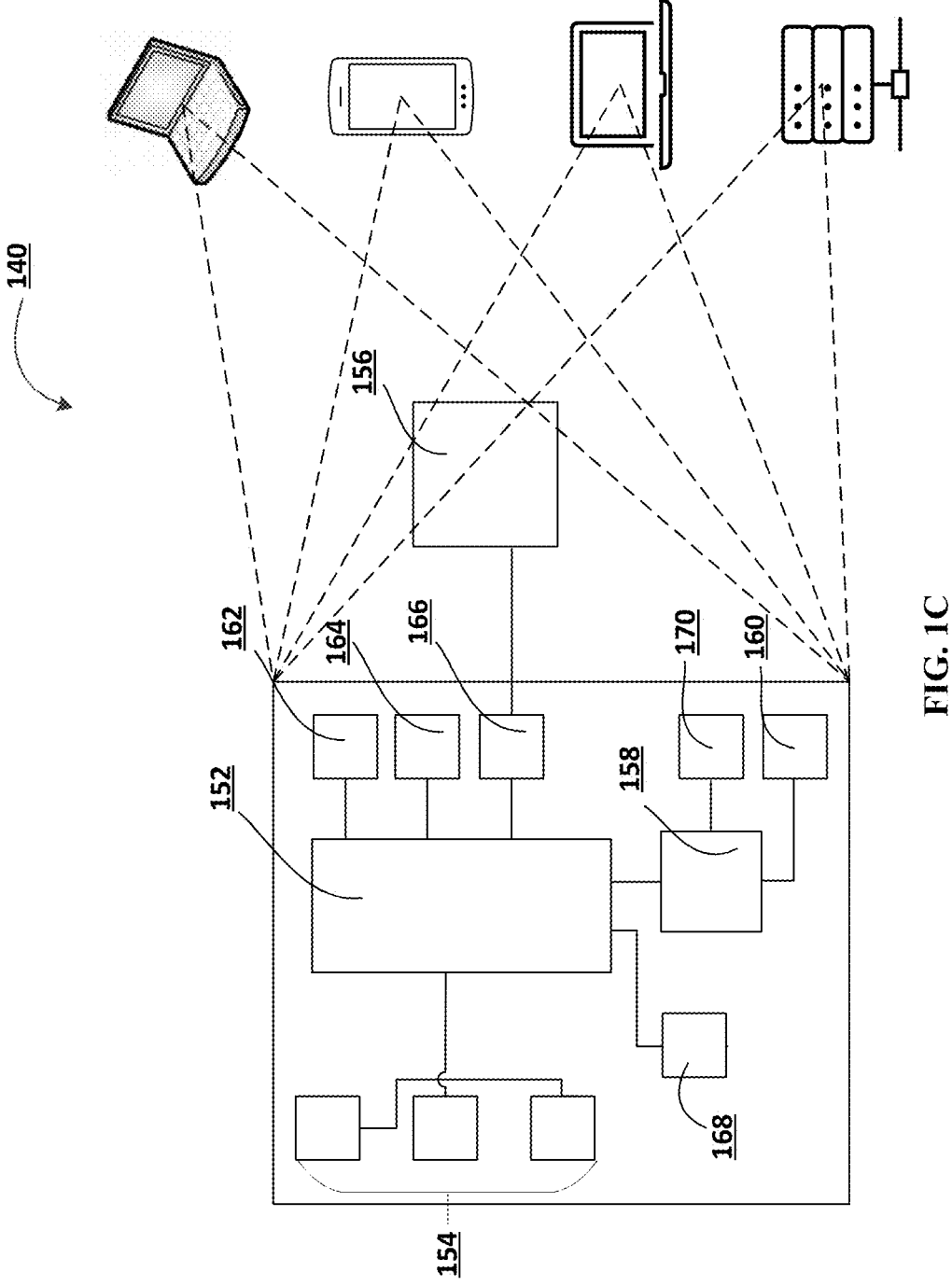
Figure 2:
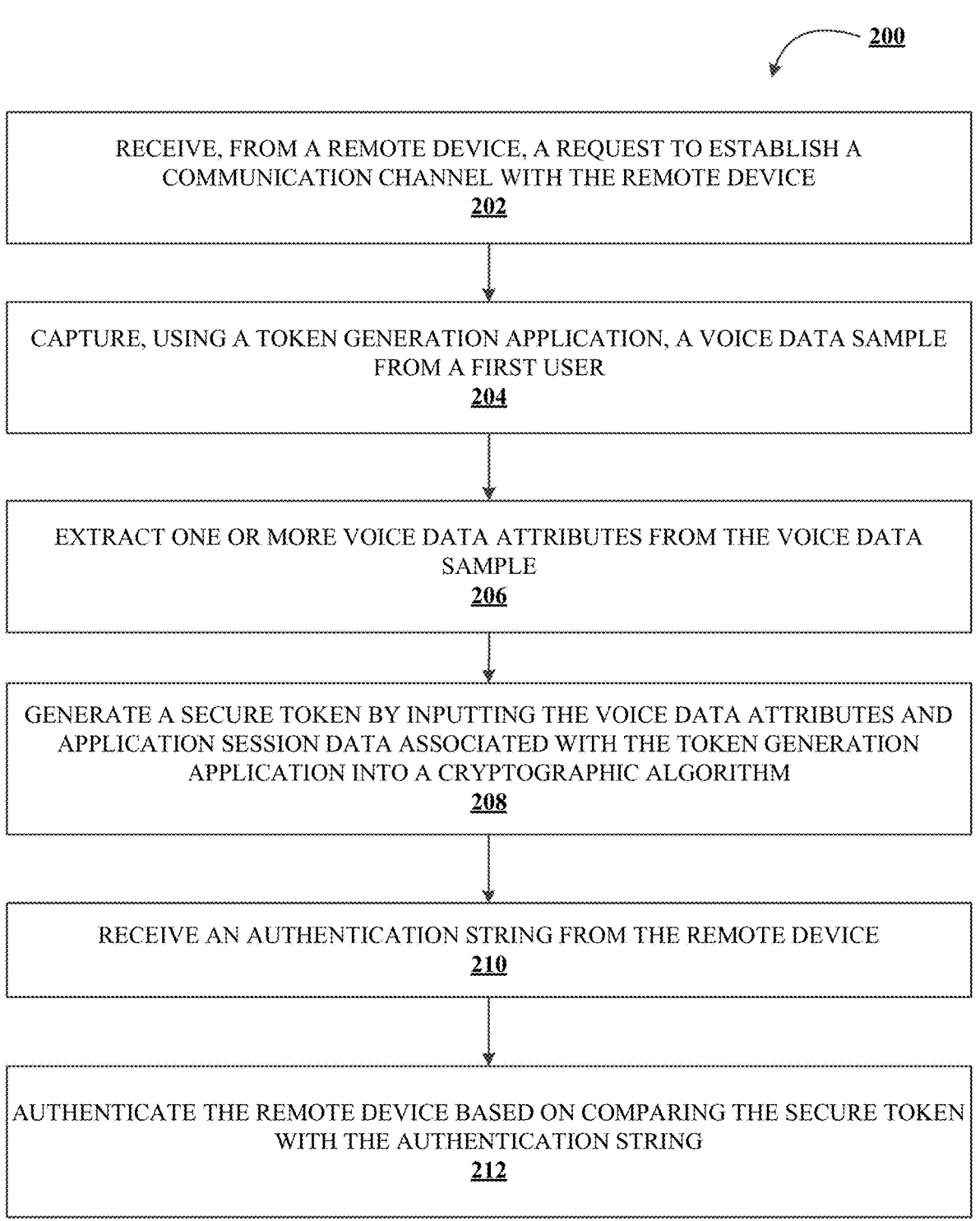

Having thus described embodiments of the invention in general terms, reference will now be made the accompanying drawings, wherein:

FIGS. 1A-1C illustrates technical components of an exemplary distributed computing environment for the system for user-initiated authentication of an electronic communication channel using a secure computing application token, in accordance with an embodiment of the present disclosure;

FIG. 2 illustrates a process flow for user-initiated authentication of an electronic communication channel using a secure computing application token, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, personalized characteristic information (e.g., iris recognition, retina scans, fingerprints, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include technology related hardware devices (e.g., desktop computers, servers, laptop computers, computer components, routers, hubs, switches, and/or the like), software (e.g., applications, libraries, data files, and/or the like), or computing resources such as processing power, memory allocation, cache space, storage space, data files, network connections and/or bandwidth, electrical power, input/output functions, and the like, or data files (e.g., document files, media files, system files, and/or the like).

As used herein, "cryptographic algorithm" or "cryptographic function" may refer to a process for converting a data input into a ciphertext output based on one or more mathematical and/or logical operations. In some embodiments, the cryptographic algorithm may be a symmetric key algorithm such as data encryption standard ("DES") algorithm, advanced encryption standard ("AES") algorithm, and/or the like. In other embodiments, the cryptographic algorithm may be an asymmetric algorithm such as an asymmetric key algorithm (e.g., Rivest-Shamir-Adelman, or "RSA") or a hash algorithm (e.g., secure hash algorithm, or "SHA").

When engaging in voice-based communications between users and entities, it is desirable to ensure the authenticity of the parties in order to reduce the incidence of unauthorized activity. In particular, there is a need for a way for both the user and the entity to verify the security and authenticity of the communication channel. To address the foregoing among other scenarios, embodiments of the present disclosure provide a system for user-initiated authentication of an electronic communication channel using a secure computing application token. The system may comprise an endpoint device that may be operated by a first user, where the endpoint device (e.g., a smartphone of the first user) has an entity-provided token generation application installed thereon. The endpoint device may receive a request from a remote device (which may be operated by a second user) to initiate a communication channel (e.g., a voice communication channel) between the endpoint device of the first user and the remote device of the second user. Subsequent to receiving the request, the token generation application may receive authentication credentials from the first user, where the authentication credentials may include a sample of personalized characteristic data. For instance, the personalized characteristic data may include voice sample data. Accordingly, in some embodiments, the token generation application may prompt the first user to provide the voice sample data by presenting the prompt on the display of the endpoint device. For example, the prompt may include a request for the first user to speak a specified word or a sequence of words.

Upon receiving the voice sample data from the first user, the system may identify and extract the attribute data from the voice sample data, where the voice attribute data may include data regarding voice frequencies (e.g., average fundamental frequencies, waveforms, and/or the like), intensity, and/or the like. The voice sample data may be combined with application session data of the token generation application, where the application session data may include information such as a unique session identifier, timestamp, user identifier, session metadata, and/or the like. The application session data may be refreshed each time the token generation is application is called (e.g., by assigning a unique session identifier per instance). In this way, at least one unique session may be generated per communication between the endpoint device and the remote device.

The attributes of the voice sample data, along with the application session data, may be inputted into a cryptographic algorithm to generate a unique secure token that may be used to authenticate the identity of the requesting remote device, the user of the remote device, and/or the communication channel. In some embodiments, the cryptographic algorithm may be a symmetric key algorithm such as DES. In other embodiments, the cryptographic algorithm may be a hash function such as SHA. Accordingly, the secure token may be an alphanumeric character string that is generated as an output of the cryptographic algorithm which uses the voice sample data and the application session data as inputs.

In cases in which the remote device is operated by an authorized entity, the system may also analyze the voice sample data received by the remote device through the voice communication channel and extract the attributes from the voice sample data. Furthermore, the system may be configured to access the application session data. In this regard, both the endpoint device and the system may share common initial seed values for generating the session identifiers. The system may then input the voice sample data attributes and the application session data into the same cryptographic algorithm that the endpoint device used to generate the secure token. In this way, the system is able to generate a system-side token (e.g., a second secure token) that comprises the same character sequence as that of the secure token generated by the token generation application of the endpoint device.

The second secure token may then be provided to the endpoint device through the remote device. Subsequently, the user and/or the endpoint device may authenticate the remote device by based on the second secure token by comparing the alphanumeric character string within the second secure token with the character string within the secure token. If a match is detected between the secure token and the second secure token, the system may validate the identity of the remote device and/or the user of the remote device, and subsequently determine that the communication channel is secure. On the other hand, if no match is detected, the system may determine that the validation of the identity of the remote device and/or the user of the remote device, and subsequently determine that the communication channel is not secure. In some embodiments, the system may further be configured to take remediation steps based on determining that the communication channel is not secure. For instance, the system may automatically close the communication channel upon detecting a mismatch between the secure token and the second secure token or upon detecting that the second secure token has not been provided within a specified time threshold (e.g., 20 seconds).

An exemplary embodiment is described as follows for illustrative purposes and is not intended to restrict the scope of the disclosure provided herein. In one embodiment, a user (e.g., a first user) may have an established relationship with an entity such as a financial institution. Accordingly, when the user receives a request for voice communications (e.g., a telephone call) on the user's endpoint device (e.g., a smartphone of the user) from a person that purports to be associated with the entity (e.g., an employee or agent of the financial institution who is calling from a remote telephony device), the user may desire to validate the identity of the calling party (e.g., a second user) to ensure that the calling party is not an unauthorized actor attempting to access the user's sensitive information (e.g., non-public information, or "NPI").

In such embodiments, the user may access the token generation application stored on the user's endpoint device. The token generation application may prompt the user to provide a voice sample (e.g., by requesting the user to speak a specified word or phrase). In other embodiments, the token generation application may automatically create a selection of the voice sample based on the user accessing the token generation application (e.g., the token generation application records the first five words spoken by the first user). The token generation application may analyze the voice sample by identifying various attributes of the voice sample (e.g., fundamental frequency, intensity, harmonic structure, and/or the like) and converting the attributes to attribute data. The endpoint device may then input the attribute data, along with the application session data, into a cryptographic algorithm (e.g., a hash algorithm) to generate an alphanumeric character string which may serve as a secure token that is unique for the current communication session.

Meanwhile, the entity's system may also generate a hash output value (e.g., a second secure token) based on the same attribute data and application session data using the same cryptographic algorithm. In cases in which the second user is a genuine authorized user (e.g., an employee of the entity), the second secure token may be presented on a display of a computing system operated by the second user (which may in some embodiments be the remote device), whereas the first secure token may be presented on the display of the endpoint device. In such embodiments, the second user may provide the alphanumeric string of the second secure token to the first user through the voice communication channel. The first user may then verify the string received from the second user with the string presented on the display of the endpoint device. If a match is detected, the first user may identify the second user as an authentic agent of the financial institution. Conversely, if a mismatch is detected or if no second secure token is provided by the second user, the first user may identify the second user as a possible unauthorized user.

In other embodiments, rather than displaying the secure tokens on the displays of the endpoint device and the remote device, the system may cause the second secure token to be transmitted to the endpoint device over an encrypted network connection between the endpoint device and the remote device. The endpoint device may then validate the second secure token by reading the character string within the second secure token and comparing it with the character string within the secure token generated by the token generation application. If a match is detected, the endpoint device may present a notification on the display of the endpoint device which indicates that the identity of the second user and/or the remote device has been validated. However, if the endpoint device detects a mismatch between the secure token and the second secure token, or if the endpoint device does not receive a second secure token within a designated time threshold, the notification may indicate that the identity of the second user and/or the remote device could not be validated.

In some embodiments, the system may limit the generation of the second secure token (e.g., the token generated by the agent of the entity) to authorized, specific instances of communication. For instance, the system may authorize a first instance of communication between the agent and the user while restricting subsequent instances of communication. In such embodiments, the system may allow the second secure token to be generated for the first instance of communication while preventing the generation of the second secure token for the subsequent instances of communication (e.g., by preventing the remote device from accessing the application session data for the subsequent instances of communication). In this way, the system may provide granular control over communications on a per-session basis.

The system as described herein provides a number of technological benefits over conventional authentication systems. In particular, by generating a secure token based on the voice data received from the user, the system may provide dynamic, real-time authentication of remote devices and parties to the user, thereby preventing the misuse or unauthorized access to the user's private information. In this way, the authentication of the remote device and/or parties establishes a secure communication channel between the user's endpoint device and the remote device.

FIGS. 1A-1C illustrate technical components of an exemplary distributed computing environment 100 for the system for user-initiated authentication of an electronic communication channel using a secure computing application token. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for user-initiated authentication of an electronic communication channel using a secure computing application token, in accordance with an embodiment of the present disclosure. The process begins at block 202, where the system receives, from a remote device, a request to establish a communication channel with the remote device. In some embodiments, the communication channel may be a voice communication channel. Accordingly, the request to establish the communication channel may be a telephone call or voice over IP ("VoIP") voice communication session initiated by a remote device, which may be a telephony device or a computing system with telecommunication capabilities. In some cases, the remote device may be operated by a party that is affiliated with an entity with whom a user has an established relationship. For instance, the user may receive a telephone call from an agent of a financial institution with which the user may hold an account. In such embodiments, the remote device may be a part of the entity's computing environment (or "entity's system"). In other cases, the remote device may be operated by a potentially unauthorized actor who may seek to gain unauthorized access to the account of the user and/or other resources of the user (e.g., the user's private, non-public information). Through the process described herein, the user may be able to authenticate, in real-time, the identity of the remote device and the operator of the remote device and ensure that the communication channel is secure.

The process continues to block 204, where the system captures, using a token generation application, a voice data sample from a user. In some embodiments, the token generation application may be configured to be accessed on demand by the user of the endpoint device. In other embodiments, the token generation application may be configured to automatically run when the endpoint device receives a request for voice communications. The token generation application may (e.g., by accessing the user input devices of the endpoint device, such as a microphone), record a sample (e.g., 5 seconds, 8 spoken words, and/or the like) of the user's voice upon being executed. In some embodiments, the token generation application may prompt the user to speak a certain word or phrase to be captured in the voice sample. In other embodiments, the token generation application may automatically take the voice sample based on the words spoken by the user to the operator of the remote device.

Meanwhile, the entity's system may access the audio data captured by the remote device to take a voice sample of the user with the same parameters as the sample that is captured by the endpoint device. For instance, the remote device may be configured to listen for the words spoken by the user in response to the prompt provided by the token generation application. In other embodiments, the remote device may be configured to take a voice sample starting from the beginning of the voice communication session. Accordingly, the entity's system may perform its operations in parallel to the operations run by the endpoint device.

The process continues to block 206, where the system extracts one or more voice data attributes from the voice data sample. The voice data attributes may include digitized information including a fundamental frequency of the voice data sample, an intensity of the voice data sample, harmonic structure of the voice data sample, and/or the like. In this regard, the system may convert the analog sample of the user's voice into a digital format such that the voice sample may be analyzed for the various attributes as described herein.

The process continues to block 208, where the system generates a secure token by inputting the voice data attributes and application session data associated with the token generation application into a cryptographic algorithm. In particular, the voice data attributes extracted from the voice data sample may be used as seed values along with the application session data. The application session data may include a session identifier, a timestamp, user identifier, and/or the like. In some embodiments, a new session identifier may be created each time the token generation application is called to generate the secure token. In this way, the system may continuously vary the inputs into the cryptographic algorithm, which in turn enhances the security of the user-driven authentication process.

The secure token is generated as the output of the cryptographic algorithm based on the inputs of the voice data attributes and the application session data. Accordingly, in some embodiments, the secure token may comprise an alphanumeric character string. As the voice data attributes and/or the application session data change per call of the token generation application, a new alphanumeric character string may be generated for each communication session.

The process continues to block 210, where the system receives an authentication string from the remote device. To generate the authentication string, the entity's systems may start by accessing the voice data sample captured by the remote device. Th entity's systems may then extract the same voice data attributes that was extracted by the endpoint device. Furthermore, the entity's systems may also have access to the same application session data (e.g., session ID, timestamp, user ID, and/or the like). Accordingly, the entity's systems may input the voice data attributes and the application session data into the same cryptographic algorithm, whereby the authentication string (or an entity-side token) is generated as an output. Accordingly, the authentication string may then be verified through the endpoint device.

The process continues to block 212, where the system authenticates the remote device based on comparing the secure token with the authentication string. In some embodiments, the authentication string may be received by the endpoint device by the operator of the remote device providing the authentication string over voice communications. In such embodiments, the character string within the secure token may be presented on the display of the endpoint device, and authenticating the remote device may comprise validating the authentication string using the character string presented on the display. In other embodiments, the authentication string may be transmitted over the network directly to the endpoint device. In such an embodiment, the endpoint device may perform the validation step. If a match is detected, the system may present a notification on the display of the endpoint device indicating that the remote device has been authenticated. If no match is detected, the notification may indicate that the remote device could not be authenticated.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for user-initiated authentication of an electronic communication channel using a secure computing application token, the system comprising:
   at least one non-transitory storage device; and
   at least one processor coupled to the at least one non-transitory storage device, wherein the at least one processor is configured to:
   receive, from a remote device, a request to establish a communication channel with the remote device;
   capture, using a token generation application, a voice data sample from a first user, wherein the token generation application is configured to run when an endpoint device received the request, and wherein the voice data sample comprises eight spoken words;
   convert the voice data sample from an analog format to a digital format to extract one or more voice data attributes, wherein the one or more voice data attributes comprise a harmonic structure of the voice data sample;
   extract the one or more voice data attributes from the voice data sample;
   generate a secure token by inputting the voice data attributes and application session data associated with the token generation application into a cryptographic algorithm that comprises a hash function;
   receive an authentication string from the remote device; and
   authenticate the remote device based on comparing the secure token with the authentication string.

2. The system of claim 1, wherein the one or more voice data attributes further comprise a fundamental frequency and an intensity of the voice data sample.

3. The system of claim 1, wherein the communication channel is a voice communication channel, wherein the authentication string is received from the remote device through the communication channel, wherein authenticating the remote device comprises presenting the secure token on a display device.

4. The system of claim 1, wherein the authentication string is received from the remote device over a network connection, wherein authenticating the remote device further comprises:
   detecting a match between the secure token and the authentication string; and
   based on detecting the match, presenting a notification on a display device, wherein the notification indicates that the remote device has been authenticated.

5. The system of claim 1, wherein the authentication string is received from the remote device over a network connection, wherein authenticating the remote device further comprises:
   detecting no match between the secure token and the authentication string; and
   based on detecting no match, presenting a notification on a display device, wherein the notification indicates that the remote device could not be authenticated.

6. The system of claim 5, wherein authenticating the remote device further comprises automatically closing the communication channel with the remote device.

7. A computer program product for user-initiated authentication of an electronic communication channel using a secure computing application token, the computer program product comprising a non-transitory computer-readable medium comprising code causing an apparatus to:
   receive, from a remote device, a request to establish a communication channel with the remote device;
   capture, using a token generation application, a voice data sample from a first user, wherein the token generation application is configured to run when an endpoint device received the request, and wherein the voice data sample comprises eight spoken words;
   convert the voice data sample from an analog format to a digital format to extract one or more voice data attributes, wherein the one or more voice data attributes comprise a harmonic structure of the voice data sample;
   extract the one or more voice data attributes from the voice data sample;
   generate a secure token by inputting the voice data attributes and application session data associated with the token generation application into a cryptographic algorithm that comprises a hash function;
   receive an authentication string from the remote device; and
   authenticate the remote device based on comparing the secure token with the authentication string.

8. The computer program product of claim 7, wherein the one or more voice data attributes further comprise a fundamental frequency and an intensity of the voice data sample.

9. The computer program product of claim 7, wherein the communication channel is a voice communication channel, wherein the authentication string is received from the remote device through the communication channel, wherein authenticating the remote device comprises presenting the secure token on a display device.

10. The computer program product of claim 7, wherein the authentication string is received from the remote device over a network connection, wherein authenticating the remote device further comprises:
   detecting a match between the secure token and the authentication string; and
   based on detecting the match, presenting a notification on a display device, wherein the notification indicates that the remote device has been authenticated.

11. The computer program product of claim 7, wherein the authentication string is received from the remote device over a network connection, wherein authenticating the remote device further comprises:
   detecting no match between the secure token and the authentication string; and
   based on detecting no match, presenting a notification on a display device, wherein the notification indicates that the remote device could not be authenticated.

12. The computer program product of claim 11, wherein authenticating the remote device further comprises automatically closing the communication channel with the remote device.

13. A computer-implemented method for user-initiated authentication of an electronic communication channel using a secure computing application token, the computer-implemented method comprising:

receiving, from a remote device, a request to establish a communication channel with the remote device;

capturing, using a token generation application, a voice data sample from a first user, wherein the token generation application is configured to run when an endpoint device received the request, and wherein the voice data sample comprises eight spoken words;

converting the voice data sample from an analog format to a digital format to extract one or more voice data attributes, wherein the one or more voice data attributes comprise a harmonic structure of the voice data sample;

extracting the one or more voice data attributes from the voice data sample;

generating a secure token by inputting the voice data attributes and application session data associated with the token generation application into a cryptographic algorithm that comprises a hash function;

receiving an authentication string from the remote device; and authenticating the remote device based on comparing the secure token with the authentication string.

14. The computer-implemented method of claim 13, wherein the one or more voice data attributes further comprise a fundamental frequency and an intensity of the voice data sample.

15. The computer-implemented method of claim 13, wherein the communication channel is a voice communication channel, wherein the authentication string is received from the remote device through the communication channel, wherein authenticating the remote device comprises presenting the secure token on a display device.

16. The computer-implemented method of claim 13, wherein the authentication string is received from the remote device over a network connection, wherein authenticating the remote device further comprises:

detecting a match between the secure token and the authentication string; and based on detecting the match, presenting a notification on a display device, wherein the notification indicates that the remote device has been authenticated.

17. The computer-implemented method of claim 13, wherein the authentication string is received from the remote device over a network connection, wherein authenticating the remote device further comprises:

detecting no match between the secure token and the authentication string; and based on detecting no match, presenting a notification on a display device, wherein the notification indicates that the remote device could not be authenticated.

18. The computer-implemented method of claim 17, wherein authenticating the remote device further comprises automatically closing the communication channel with the remote device.

* * * * *